US011521353B2

(12) United States Patent
Marghidanu

(10) Patent No.: US 11,521,353 B2
(45) Date of Patent: Dec. 6, 2022

(54) AUTOMATED PROCESSING FOR DETERMINATION OF A VOLUME OF AN OBJECT IN A DIGITAL ENVIRONMENT

(71) Applicant: Microsoft Technology Licensing, LLC, Redmond, WA (US)

(72) Inventor: Mircea Liviu Marghidanu, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 71 days.

(21) Appl. No.: 17/217,834

(22) Filed: Mar. 30, 2021

(65) Prior Publication Data
US 2022/0270326 A1 Aug. 25, 2022

Related U.S. Application Data

(60) Provisional application No. 63/151,534, filed on Feb. 19, 2021.

(51) Int. Cl.
*G06T 17/20* (2006.01)
*G06T 15/30* (2011.01)
*A63F 13/52* (2014.01)

(52) U.S. Cl.
CPC ............ *G06T 17/205* (2013.01); *A63F 13/52* (2014.09); *G06T 15/30* (2013.01)

(58) Field of Classification Search
None
See application file for complete search history.

(56) References Cited

U.S. PATENT DOCUMENTS

| 10,659,789 | B2* | 5/2020 | Hemmer | G06T 9/001 |
| 11,321,917 | B1* | 5/2022 | Peivareh | G06T 17/20 |
| 2020/0005537 | A1* | 1/2020 | Inagaki | G06T 19/20 |
| 2020/0151952 | A1* | 5/2020 | Aksit | G06N 3/084 |
| 2020/0226829 | A1* | 7/2020 | Szasz | G06T 17/20 |

* cited by examiner

*Primary Examiner* — Nurun Flora

(57) ABSTRACT

The present disclosure introduces automated and repeatable processing for determining and managing volumes of objects within a digital environment. In one non-limiting example, processing of the present disclosure automatically generates volumes of static objects from associated meshes within a gaming environment. However, the present disclosure is applicable to determine a volume of any type of object within any type of digital content. From an original mesh of an object, a low-frequency volumetric mesh (reduced mesh) is automatically generated. A volume of an object may be automatically determined from analysis of the reduced mesh. Volumetric data is then be integrated within digital content for a variety of applicable use cases. For example, a reduced data set is created to approximate light sources relative to the interior of a static object (e.g., building) within a digital environment, enabling developers to create more realistic representations of lighting within that static object (e.g., building).

20 Claims, 3 Drawing Sheets

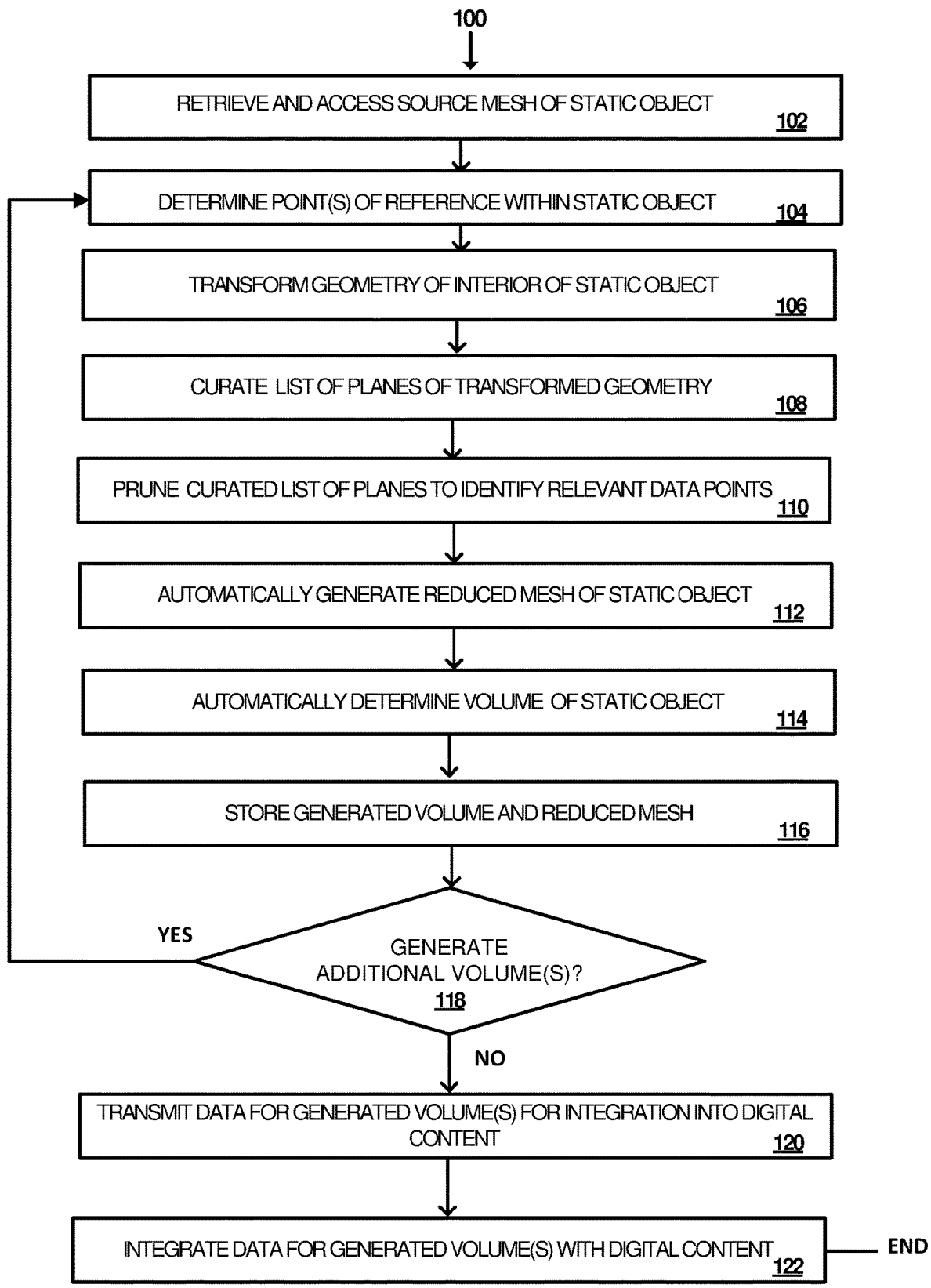

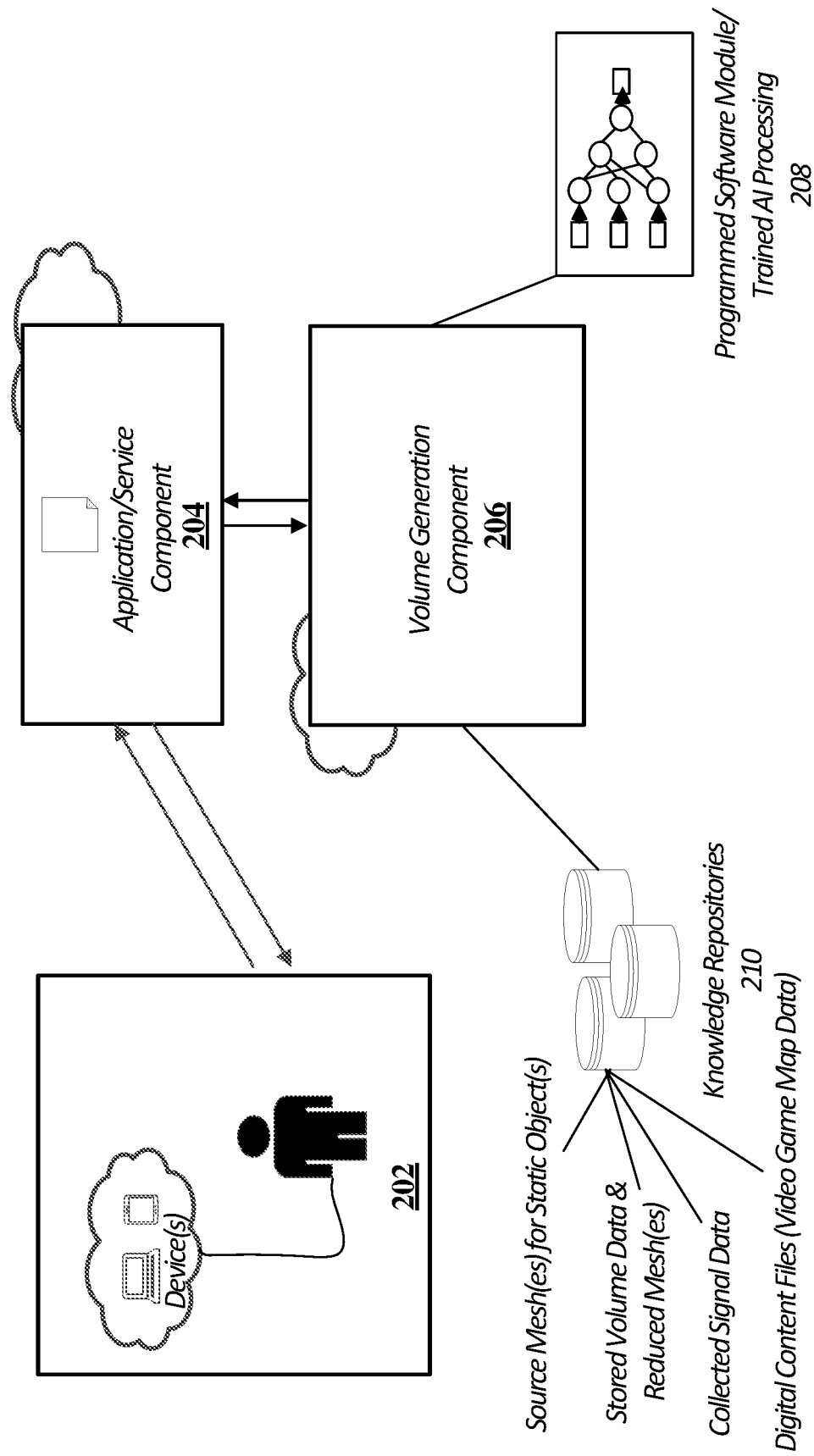

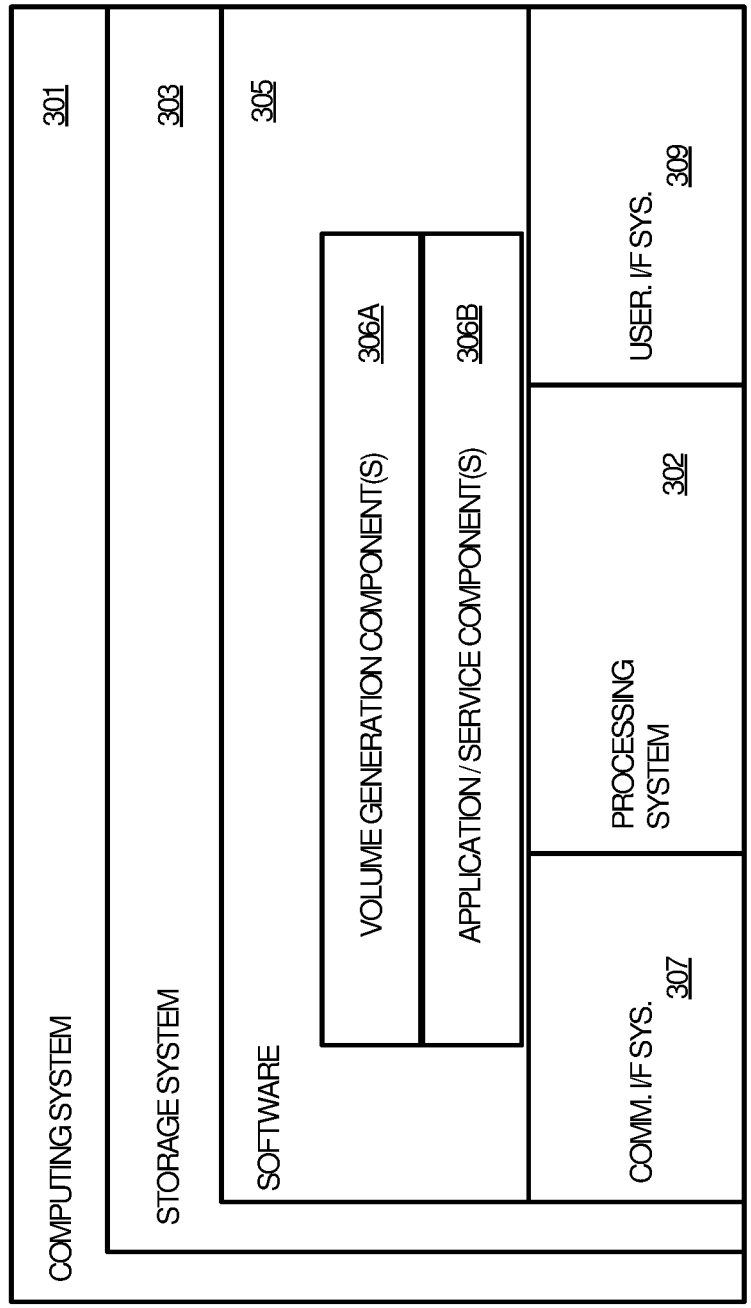

AUTOMATED PROCESSING FOR DETERMINATION OF A VOLUME OF AN OBJECT IN A DIGITAL ENVIRONMENT

CROSS REFERENCE TO RELATED PATENT APPLICATIONS

This application is a non-provisional application that claims priority to U.S. Provisional Patent Application No. 63/151,534 entitled "AUTOMATED PROCESSING FOR DETERMINATION OF A VOLUME OF AN OBJECT IN A DIGITAL ENVIRONMENT", filed on Feb. 19, 2021, which is hereby incorporated by reference herein, in its entirety.

BACKGROUND

A volumetric mesh is a polygonal representation of the interior volume of an object. Traditionally, determination of a volume of an object is a time-intensive manual process. This is especially true when considering that volumes are to be calculated for different states of an object within digital content such as a gaming environment, where an object state can change. Traditionally, game developers would require artists to manually create and place a volume of an object so that effects can be applied to that object. For instance, a volume of an object would need to be known to simulate lighting techniques such as ambient occlusion (e.g., global illumination) within a gaming environment. Manual calculation of a volume of an object is an extremely time-intensive and tedious process because artists would essentially be required to manually fit parametric boxes with a given space to match the interior volume of an object and perform complex aggregative mathematical computations. This is a quite complex process as many objects within a gaming environment are not perfect cubes that seamlessly fit together. As such, processing for determination and management of volumes of objects stands to be improved, especially when managing objects within a gaming environment.

Furthermore, another technical challenge arises from the realization that a state of an object can change within a digital/virtual environment such as a gaming environment. For instance, say a volumetric mesh is generated for a room in a building of a gaming environment, but a wall of that room is then destroyed during gameplay. Game developers would require artists to manually re-calculate a volume for the altered room (i.e., a different state of the original room object) resulting in the creation of a different volumetric mesh and a new volume. This process would likely need to be repeated for N number of modifiable objects within a gaming environment. As such, it is clear that traditional methods of volumetric determination place a larger processing burden on game developers, artists and associated processing devices, through the need to manually determine a large number of volumes and subsequently generate respective volumetric meshes.

Yet another technical concern is the computer hardware required to process and present complex renderings of objects. Traditionally, high-end graphical processing units (GPUs) may be required to create photorealistic content renderings that incorporate ambient occlusion. However, high-end GPUs are not cost-effective to include in many widely available consumer electronics. Therefore, there is a technical need to provide an alternative way to generate quality complex renderings (including occlusion or other effects) without requiring high-end GPUs.

SUMMARY

For resolution of the above technical problems and other reasons, there is a technical need to introduce automated and repeatable processing for determining and managing volumes of objects within a digital environment whether the processing for generating said volumes occurs in an offline scenario or dynamically during content execution. In one non-limiting example, processing of the present disclosure automatically generates volumes of static objects from analysis of associated meshes (e.g., building meshes) within a gaming environment. However, it is to be recognized that the present disclosure is applicable to determine a volume of any type of object within any type of digital content. From an original mesh of an object, a low-frequency volumetric mesh (e.g., reduced mesh) of a static object (e.g., building or structure) is automatically generated. A volume of that static object can then be automatically determined from analysis of that reduced mesh. Once volume data is determined for a static object, that volume data can be integrated within a digital environment to enable a variety of use cases that pertain to managing presentation of that object within a digital environment. For instance, volumetric data of a static object is used to apply effects (e.g., optical effects) on the static object during rendering of the static object within a digital environment. In an example where an effect is an optical effect, creation of a volume of a static object helps developers/artists identify where light can be found within an interior of an object (e.g., static object). In an example where a static object is a building, a reduced data set is automatically created to approximate light sources relative to the interior of building, which can then be used by developers to create more realistic representations of lighting within that building without requiring ray tracing processing to be executed. Other examples of use cases are also described including dynamic management of volumetric data during execution of digital content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 illustrates an exemplary method related to automatic generation and management of volumes of static objects within a digital environment, with which aspects of the present disclosure may be practiced.

FIG. 2 illustrates an exemplary system diagram of components interfacing to enable automatic generation and management of volumes of static objects within a digital environment, with which aspects of the present disclosure may be practiced.

FIG. 3 illustrates a computing system suitable for implementing processing operations described herein related to generation and management of volumes and volumetric meshes, with which aspects of the present disclosure may be practiced.

DETAILED DESCRIPTION

As identified in the foregoing, the present disclosure introduces automated and repeatable processing for determining and managing volumes of objects within a digital environment whether the processing for generating said volumes occurs in an offline scenario or dynamically during content execution. In one non-limiting example, processing of the present disclosure automatically generates volumes of static objects from analysis of associated meshes (e.g., building meshes) within a gaming environment. However, it is to be recognized that the present disclosure is applicable to determine a volume of any type of object within any type of digital content. From an original mesh of an object, a low-frequency volumetric mesh (e.g., reduced mesh) of a static object (e.g., building or structure) is automatically generated. A volume of that static object can then be automatically determined from analysis of that reduced mesh. Once volume data is determined for a static object, that volume data is integrated within a digital environment to enable a variety of use cases that pertain to managing presentation of that object within a digital environment. For instance, volumetric data of a static object is used to apply effects (e.g., optical effects) on the static object during rendering of the static object within a digital environment. In an example where an effect is an optical effect, creation of a volume of a static object helps developers/artists identify where light can be found within an interior of an object (e.g., static object). In an example where a static object is a building, a reduced data set is automatically created to approximate light sources relative to the interior of building, which can then be used by developers to create more realistic representations of lighting within that building without requiring ray tracing processing to be executed. Other examples of use cases are also described including dynamic management of volumetric data during execution of digital content.

Some non-limiting examples of use cases of generated volumes comprise but are not limited to: content rendering (e.g., object rendering and/or image rendering); application of optical effects (e.g., occlusion, global illumination, shadowing); post effects (e.g., depth of field, blur, lightening/darkening); and management of enablement/disablement of volumes during execution of digital content (e.g., enable/disable volumes during gameplay of a video game), among other examples. Creation of a volume of a static object helps developers/artists identify where light can be found within an interior of an object (e.g., static object). In an example where a static object is a building, a reduced data set is automatically created to approximate light sources relative to the interior of building, which can then be used by developers to create more realistic representations of lighting within that building without requiring ray tracing processing to be executed. Other examples of use cases are also described including dynamic management of volumetric data during execution of digital content.

As compared with traditional processing for volume determination which mainly relies on the execution of numerous manual processing operations (with the aid of computing devices), processing described in the present disclosure drastically reduces the time and processing efforts required to create and place an object volume by automatically generating the same. For instance, through processing described herein, game developers and/or artists can determine volumes of static objects and generate volumetric meshes for static objects with ten to twenty percent of the effort that is traditionally required by manual processing previously discussed. Additionally, developers/artists would not be required to hand-place volumes. As previously identified, manual processing for volumetric evaluation would require users to create a series of parametric boxes and stretch those boxes to fit the interior space of an object. When an object has a complex layout, the number of boxes (and the shapes thereof) become very complicated and convoluted. Furthermore, manual processing is done by eye by artists/developers, where a user may estimate/approximate shapes and spaces within an object. In addition to being tedious and inefficient, traditional processing may even result in imprecise estimations. Traditionally, there is no automated processing that reads a source mesh and precisely determines planes in an interior of a static object. Therefore, in traditional generation of volumetric meshes, any modifications to a static object would require this process to be repeated from square one by developers/artists, resulting in hours and hours of processing effort.

Yet another technical advantage of the present disclosure is that processing described herein enables the generation of volumes of objects and management thereof without requiring high-end and expensive GPUs. The present disclosure provides an alternative to execution of ray tracing to simulate real-life lighting effects in digital content. That is, processing of the present disclosure does not require tracing of every pixel of an interior of a static object, thereby providing an alternative solution to ray tracing. Through novel processing to automatically determine a volume and generate a volumetric mesh of an object, game developers can create occlusion renderings with less effort using widely available computing devices. As such, high-quality occlusion renderings can be generated and rendered on currently launched gaming consoles and/or lower-end hardware (e.g., computing hardware that does not require complex GPUs or RTX-specific video cards). Additionally, processing requirements and time requirements for generating video games can be greatly reduced by avoiding the need for manual generation of a separate gaming software kit with hand-placed ambient occlusion volumes.

Exemplary technical advantages provided by processing described in the present disclosure comprise but are not limited to: automatic generation of reduced meshes (low-frequency meshes) for objects within a digital environment (e.g., gaming environment); automatic determination of volumes of objects (e.g., static objects) from analysis of a reduced mesh; automated processing that utilizes an existing source mesh of an object to execute mesh reduction processing; processing that intelligently identified points of reference within an interior of a static object including automatic placement of proxy reference points; novel curation processing that identifies planes of interest and associated data points within an interior of a static object to improve processing for generation of a reduced mesh of a static object; novel pruning processing to identify a subset of relevant data points to create a reduced mesh of a static object; ability to efficiently determine volumes for a plurality of different states of a static object in an automated manner, where volume data can be automatically enabled/disabled at run-time of a digital environment (e.g., gaming environment); improved processing efficiency (e.g., reduction in processing cycles, saving resources/bandwidth) for computing devices when generating meshes of static objects and determining volumes of the static objects as compared with traditional volumetric evaluation (i.e., manual processing); implementation of a volume generation component that is further configured to interface with a plurality of applications/services (e.g., applications/services of a distributed software platform) to extend functionality during for use case application of a generated volumetric mesh; and introduction of methods providing an alternative to ray tracing that may require complex computer hardware, among other technical advantages.

In one non-limiting example, a source mesh of a static object of digital content is retrieved. That source mesh is analyzed to automatically determine reference points within an interior of the static object. In one example, reference points may be points on the interior of the static object that are already programmed into the original source mesh. As a non-limiting example, light probe objects may be identified within an interior of a static object. In alternative examples, processing may occur that automatically generates proxy reference points for placement within an interior of the static object. The proxy reference points may be automatically placed at different positions within the interior of the static object. Regardless of how the reference points of the interior of the static object are identified, a list of planes associated with the interior of the static object may be identified relative to the reference points. The list of planes may be further curated to isolate a subset of relevant planes within the interior of the static object. The subset of relevant planes may then be pruned to identify a subset of relevant data points associated with the subset of relevant planes. From there, a reduced mesh may be automatically generated for the static object based on analysis of the subset of relevant data points identified as a result of the pruning of the subset of relevant planes. A volume of the static object may be automatically determined based on analysis of the subset of relevant data points associated with the reduced mesh.

A generated volume may then be stored for recall and subsequently integrated within digital content to create effects relative to the static object. For instance, effects may be applied to the static object for content rendering using integrated volumetric data. Non-limiting examples of effects have been previous referenced and are also further described in the present disclosure. As an example, ambient occlusion values may be determined for an interior of a static object to apply ambient occlusion therein. In further instances, volumetric data (e.g., reduced mesh and determined volume) may be used to help automate processing to generate volumes for different states (modified states) of a static object. In even further examples, integrated volume data may be dynamically managed during real-time rendering of digital content. For instance, processing of the present disclosure may be configured to automatically toggle control over enablement/disablement of volume data (e.g., a specific volume), within data pertaining to the video game map of a video game environment. This may occur based on analysis of signal data collected relative to a state of the static object within the video game environment.

FIG. 1 illustrates an exemplary method 100 related to automatic generation and management of volumes of static objects within a digital environment, with which aspects of the present disclosure may be practiced. As an example, method 100 may be executed across an exemplary computing system 301 (or computing systems) as described in the description of FIG. 3. Exemplary components, described in method 100, may be hardware and/or software components, which are programmed to execute processing operations described herein. Non-limiting examples of components for operations of processing operations in method 100 are described in system diagram 200 (FIG. 2). Processing operations performed in method 100 may correspond to operations executed by a system and/or service that execute computer modules/programs, software agents, application programming interfaces (APIs), plugins, AI processing including application of trained data models, intelligent bots, neural networks, transformers and/or other types of machine-learning processing, among other examples. In distributed examples, processing operations described in method 100 may be implemented by one or more components connected over a distributed network. For example, components may be executed on one or more network-enabled computing devices, connected over a distributed network, that enable access to user communications. In one non-limiting example, processing operations described in method 100 may be executed by a component such as a volume generation component(s) 206 (of FIG. 2) and/or a component 208 for implementation of a trained software module or trained AI processing.

Method 100 begins at processing operation 102, where a source mesh of an object is automatically accessed and retrieved. As an example, a source mesh is a mesh of a static object provided with a digital environment such as a gaming environment. An exemplary mesh that is referenced as a source mesh is the collection of vertices, edges, and faces that make up a 3D object. A mesh contains the geometry of the objects, including the surfaces, lines and vertices that make up an object. In a gaming scenario, a source mesh may be generated by game developers as part of a video game map. With information about an object mesh, a game engine can utilize the object mesh as a source to render an object within a gaming environment, including the application of effects to the static object as well as objects within an interior of a building/structure. Static objects may be flagged as a landmark object with a video game map of a gaming environment, where a mesh of a static object is not vertex animated. However, a mesh of a static object can still be moved, scaled or reskinned in real-time (or near real-time). As a non-limiting example, a mesh of a static object may be a mesh of a building (or structure mesh) within a gaming environment. Generation and management of exemplary object meshes including specific types of object meshes (i.e., a static mesh) are known to one skilled in the field of art.

Traditionally, manual processing for generation of a volume of an object does not consider a source mesh where artists do not pull a source mesh to contemplate effects (e.g., application of lighting) within a building/structure object. Processing operation 102 comprises execution of code that retrieves data associated with a source mesh of a static object. This may comprise accessing files run by a game engine (e.g., video game map) to isolate a mesh of a static object. In some examples, a software module executing on a computing device is configured to automatically access and parse files of a game engine to identify a source mesh for an object. Use of the source mesh enables a user to identify the metes and bounds of an interior of a static object, so that further effects can be applied to the static object across different states (e.g., as the state of the static object changes during gameplay).

Once a source mesh of an object is accessed, flow of method 100 may then proceed to processing operation 104. At processing operation 104, points of reference positioned within interior of static object are determined from programmed analysis of the source mesh. It is important to identify positions of points of reference within an interior of the static object to properly calculate a volume thereof and ultimately determine how to apply effects (e.g., light applied to or passing through the object) to an interior of a static object. Reference points within an interior mesh may be known points of reference (existing within data of a source mesh) and/or automatically added as proxy points of reference for aid of subsequent processing described herein. In some alternative examples, a computer program is adapted to enable users to manually select proxy points of reference within an interior of a static object. A software module and/or trained AI processing may be applied to identify points of reference that are positioned within the interior of a static object. For instance, a component 208 (FIG. 2) for implementation of a programmed software module/trained AI processing is used to analyze data points within an interior of a static object to determine most relevant points of reference for volumetric analysis and automatically select those reference points for subsequent processing.

In one example, processing operation 104 comprises identifying one or more data points associated with a specific data type (e.g., object type) within an interior of a static object. In doing so, processing operation 104 executes a query to search for a specific data type/object type within parameters of an interior of a static object. For instance, light probe objects (or groups of light probes) that are placed within an interior of object (e.g., building, structure) are identified through processing that automatically analyzes data associated with the source mesh. Processing operations of the present disclosure parses data to identify one or more light probe objects positioned within an interior of a static object. Light probes may be generally described as objects that collect information about the transmission of light around those objects and within an interior of a static object. Exemplary light probes may be used to produce global illumination, collect light data and further help determine how to illuminate an interior of object of a digital environment by identifying data that indicates how light reflects off points within an interior of a static object. Use of light probes as points of reference of the present disclosure provides assurance that a point of reference is inside (on the interior) of a static object because said light probe objects are already programmed as objects in a source mesh (e.g., that reflects an interior of a static object). As such, using light probe objects as known points of reference within an interior of an object is helpful to create a mesh reduction in a more efficient processing manner rather than requiring artists to manually selecting points of reference within an interior of a static object and subsequently analyzing all the ways in which light may interact within the interior of a static object. While one or more light probes may be a specific object type that is searched, it is to be recognized that other data types (object types) may be utilized as points of reference. Any data point within an interior of a static object can be used as a point of reference for subsequent processing, regardless of the type of data object.

Alternatively, processing operation 104 comprises processing operations that place proxy objects (or proxy points of reference) within an interior of a static object. In some cases, this occurs in lieu of identification of light probe objects or even in combination with the same to identify additional points of interest within an interior of a static object. Importantly, it is to be recognized that placing a proxy point of reference for volumetric evaluation would not add any run-time cost a gaming environment as that is not data that is processed at run-time of a gaming environment. In one technical instance, proxy points of reference are automatically selected based on application of a programmed software module and/or trained AI processing.

While not required to be applied, trained AI processing is utilized to enhance processing described herein. Trained AI model is adapted to execute processing operations including but not limited to: analyzing data of an interior of a static object including the application of deterministic rules; identifying objects within an interior of a static object (e.g., including light probe objects); identifying a plurality of proxy points of reference within an interior of a static object; executing a relevance ranking to determine the most relevant proxy points of reference and positioning thereof relative to a layout of an interior of a static object; and selecting one or more proxy points for subsequent analysis based on a result of relevance ranking processing, among other types of processing operations. A trained AI model may be trained based on a corpus of training data that comprises data from analysis of interiors of a plurality of static objects including static objects having similar interior layouts. This may help tune an AI model for efficient selection of proxy reference points that are most relevant to volumetric determination.

With respect to automatic selection of proxy reference points, specific data types/object types within an interior of a static object are analyzed from a layout of an interior of a static so that relevant points of analysis can be identified across an entirety of an interior of a static object. For instance, positioning of objects within an interior of a static object can be comparatively analyzed (position-wise relative to one another) to select proxy reference points that are most beneficial to creating realistic lighting within an interior of an object. In some examples, deterministic rules are applied by a programmed software module and/or a trained AI model to selectively automate determination of placement positions of proxy points of reference. Determination of proxy reference point selection may further contemplate points of reference that are exterior to a static object. For understanding, say a light probe object is identified as being placed exterior to a wall of a static object, where identification of the same may be used to select a relevant proxy point of reference on the interior of the static object (e.g., on or proximate to the wall of the static object).

As previously referenced, proxy reference points can be placed anywhere within the interior of a static object to accomplish volumetric evaluation. For instance, a plurality of proxy points of reference may be sampled across the entirety of the interior of a static object. In one instance, a deterministic rule is set to place a proxy point of reference at a point within an interior of a static object based on a result of a relevance analysis of the object types (and proximity of the object types) within the interior of the static object. As an example, analysis of objects within an interior of a static object yields a relevance determination to place on one more proxy reference points at positions that define the bounds of an interior of a static object. In other instances, a deterministic rule is set to place proxy points of reference randomly at points throughout an interior of static object. In even further examples, deterministic rules are further set to place proxy reference points relative to one another in a spatially aware manner. In one instance, proxy reference points are placed equidistant from one another throughout the interior of a static object. In other instances, deterministic rules are set to select proxy reference points within a distance range relative to placement of an object within an interior of a static object and/or other placed proxy reference points. In even further examples, deterministic rules are applied that automatically select proxy reference points within different regions of an interior of a static object. For instance, the interior of a static object may be segmented into zones and one or more proxy points in each zone may be identified. In one example, processing automatically selects random proxy reference points within each segmented zone while in other instances a relevance ranking processing may be applied to select the best possible proxy reference point for an individual zone, for example, relative to placement of objects within an individual zone and/or proxy reference points in other identified zones.

Once proxy reference points are identified within an interior of a static object, flow of method 100 proceeds to processing operation 106. At processing operation 106, a geometry of a source mesh is analyzed and transformed into a list of planes. Processing operation 106 analyzes the source mesh to automatically determine a list of all planes associated with the interior of a static object. This processing comprises identification of all planes that have a point that occurs within the interior of the static object. Planes within an interior of a static object may further help identifying the metes and bounds of the interior of the static object for volumetric evaluation. For example, each plane is a quantization of parametric objects (e.g., boxes, triangles) that can be used to identify structure and positioning of the static object (e.g., walls, floors, ceilings, columns/pillars, etc.) and beyond the interior of a static object. In most practical examples, it is likely that a wall of a building is not absolutely straight, where an example wall may have jagged edges or sharp curves requiring significant processing effort and a plurality of parametric objects to gauge a volume. Processing operation 106 quantizes a plurality of parametric objects associated therewith into a single plane (e.g., the entirety of a wall within a building). Identification of planes within an interior of a static object helps remove some of the high-frequency detail that normally accompanies the manual processing to generate a volume of an object. As should be recognized, planes identified in processing operation 106 extend infinitely. In some cases, planes may not be specific to a single static object of a digital environment. As such, it is important to identify the data portions of planes that pertain to the interior of a static object. Processing for creation of a list of planes of an interior of a static object occur through triangulation of data associated with the source mesh. Operations for execution triangulation of data associated with a source mesh including application of a triangulation algorithm are known to one skilled in the field of art.

Once a list of planes within an interior of a static object is generated, flow of method 100 proceeds to processing operation 108. At processing operation 108, curation processing is executed that prunes the listing of planes associated with the source mesh to identify and isolate planes that are part of the interior of the static object which possessing specific characteristics relevant to the type of effect being applied (e.g., lighting, ambient lighting). Curation processing (processing operation 108) evaluates and curates the list of planes previously generated. A first level of curation identifies directions of planes in the listing of planes to generate a determination as to whether to keep a specific plane or remove that plane from further consideration. For example, planes that are outward facing (e.g., facing toward outside from the perspective of the interior of a static object) are identified and removed from subsequent analysis. Planes that are inward facing are retained for subsequent analysis. Whether a plane is facing inward or facing outward may be judged using the points of reference previously identified. For example, a direction of a plane (e.g., for walls, columns, ceilings, floors) is evaluated relative to the light probe objects and/or interior proxy points of reference. If at least one point of reference (e.g., light probe object) identifies a plane (e.g., wall) that faces it (inward facing), that plane is added to a curated list of planes for further consideration. If a point of reference (e.g., light probe object) does not have a plane that is inward facing to that reference point, then that plane discarded and is removed from further processing consideration. This curation processing generates a list of planes that are inward facing towards a point of reference (e.g., light probe object, proxy point of reference).

As such, the curation processing (processing operation 108) ultimately generates a subset of relevant planes within an interior of a static object. For example, the subset of relevant planes, identified from a result of curation processing, may comprise only planes of the interior of the static object that are identified as being inward facing relative to the reference points within the interior of the static object. This helps produce a low-level/rough estimation of an interior of a static object that is useful for generating a volume of an interior of the static object.

Flow of method 100 proceeds to execute additional levels of abstraction for generation of a reduced mesh (reduced frequency) from the source mesh. At processing operation 110, additional pruning processing is executed to identify the most relevant data points within an interior of a static object. This processing further aids in reducing the frequency of the original object mesh (source mesh). Data of the subset of relevant planes (curated list of planes), identified relative to the identified points of reference, is analyzed to identify the planes that are closest to the viewing perspective of a user (user perspective). Those planes can then be further evaluated to determine key data points and points of intersection between planes. In doing so, processing operation 110 is configured to automatically evaluate the list of curated planes to determine, for each plane, viewpoint direction from the user perspective. For each plane, data values thereof are identified and analyzed to identify the data points that are closest to the users' viewing perspective (e.g., direction of view from the perspective of the user). This may provide points of reference on planes that are to be targeted as the most important to the reflection of light. For instance, processing operation 110 identifies the data points that are most likely to be touched by light as compared with some other data points that may pertain to areas within an interior of a static object that may not be as visible to a user. Additionally, data points on a plane that are farther from a viewing perspective of a user can be marked as well. Ultimately, identification of relevance of data points relative to a viewing perspective of a user can provide markers indicating how one or more groups of data points should be rendered. For instance, a relevant data point on a plane are marked to indicate that a segment of the plane should be darkened/blurred as compared to another segment of the plane that is more visible to the user (and should be lightened or highlighted).

Moreover, another consideration to factor in is how light would be affected by a specific plane relative to other planes. It is important to identify data points between intersecting planes. Processing operation 110 may further comprise processing that automatically identifies intersections of planes and associated data values. This may be done through application of mathematics (e.g., applied equations) as known to one skilled in the field of art. Identifying the key intersecting data points enables the generation of a very low frequency representation of the source mesh, for example, producing way less parametric considerations (e.g., less triangles/parametric objects to consider for application of effects such as lighting). Sometimes, the closest plane to a user may not be the best plane to focus the reflection of light.

For instance, if there is a pillar/column that reflects light from another plane (e.g., wall), it is still necessary to consider other intersection points (e.g., a back wall behind the pillar) for light reflection. As such, further curation/pruning is necessary to determine data points to focus on for light reflection purposes. This comprises analysis of intersections between planes. An area of a plane may vary based on intersection with other planes. Light (reflected light) might hit a pillar placed in front of a back wall at one position but reflect directly off that backwall in another section that does not present the pillar. Furthermore, in a use case where data points may not be as visible to a user (e.g., not touched by light), processing operations can be applied to automatically darken (or blur) those data points at run-time. In some examples, processing may apply a weighting to rank the importance of data points, along a plane, to the viewing perspective of the user. This helps processing efficiency when applying lighting effects across a plane during run-time processing. In any case, combined data is generated that determines a subset of relevant data points associated with the subset of relevant planes, which is a representation of key data points on a plane combined with intersecting data points for the subset of relevant planes.

At processing operation 112, a reduced mesh of an interior of a static object is generated. Processing for mesh creation from data points including mathematical equations and computing programs for mesh generation are known to one skilled in the field of art. Above what is traditionally known, processing operation 112 creates a mesh based on the curated/pruned data (e.g., curated listing of planes and identified relevant data points). Processing to automatically generate a reduced mesh occurs through a programmed software module and/or application of trained AI processing as described herein. As previously indicated, a reduced mesh is a result of mesh reduction processing, including application of processing to abstract a source mesh via pruning processing, that produces a low frequency representation of the source mesh (e.g., way less triangles/parametric objects to consider for application of effects such as lighting) to reflect a volume of an interior of the static object. The low frequency mesh (e.g., reduced mesh) is a 2D representation of the volume of the interior of a static object that is represented as mathematical formulae which can then be converted to 3D. Adding dimensions adds layers of complexity when trying to fit objects within a static space, so it is most useful to determine the volume of a static object in 2D before determining how to apply that in 3D.

In creating the reduced mesh, the curated planes are considered as finite geometric objects. As previously referenced, generation of the reduced mesh evaluates not only the data points identified for the curate list of planes but also the intersections between the planes. Processing operation 112 comprises execution of processing that automatically imports data pertaining to intersections between curated planes and the points of reference on planes that are to be targeted (e.g., for light reflection). Those respective data points are automatically plotted as a combined data. This combined data is propagated to a computer program for mesh generation, where the result is generation of a low frequency mesh of the static object. For example, automatic generation of a reduced mesh comprises creation of a rendering that is generated by plotting the one or more relevant data points for each of the planes and the intersecting data points.

Using the imported (and plotted) geometry of the reduced mesh, a volume of the interior of the static object may be automatically determined (processing operation 114). Mathematical processing for calculating a volume of a static object is known to one skilled in the field of art. Above what is traditionally known, processing described herein executes automatic processing to automatically determine a volume of a static object using the low-frequency mesh (e.g., reduced mesh) generated in processing operation 112. This automated processing may occur through a programmed software module and/or application of trained AI processing, ultimately resulting in a more efficient determination of a volume of a static object. For instance, processing operation 114 comprises automatically determining a volume of the static object based on analysis of the subset of relevant data points associated with the reduced mesh. This processing comprises using one or more programmed equations to generate a volumetric calculation from analysis of the relevant data points associated with the reduced mesh.

Flow of method 100 then proceeds to processing operation 116. At processing operation 116, the reduced mesh and generated volume are stored for recall. For instance, processing operation 116 stores data pertaining to the automatically generated volume for the interior of the static object on a distributed data storage for subsequent recall. In further examples, the reduced mesh is also stored for recall on the distributed data storage. Such information is useful to determine how to apply effects (e.g., lighting) on/within the interior of a static object within digital content or utilize a reduced mesh to semi-automate processing for generation of volumetric data for modified states of static objects. In one example, data for a generated volume is stored as part of data files associated with digital content (e.g., a video game). For instance, a generated volume and/or volumetric mesh is propagated as an input into a game engine to enable effects to be applied to the static object during run-time processing.

As previously referenced, developers/artists may also utilize volumetric data (e.g., generated volume, volumetric mesh) to create/manage different states of a static object in digital content (e.g., different states of a static object as presented in a video game). Furthermore, as a larger number of reduced meshes are generated (e.g., for different static objects), a corpus of training data for trained AI processing can also be updated to intelligently train a classifier of a trained AI model to improve determinations comprising but not limited to: identifying portions of static objects; identifying positions of references points e.g., light probe objects) and/or proxy reference points; correlation of data used during pruning processing including identifying planes of interest and intersection between planes in in various static objects as well as identifying importance of data points (e.g., from the viewing perspective of the user), among other examples. This processing further improves processing efficiency when determining a volume of a modified state of an object.

At decision operation 118, it is determined if the generated volume and/or volumetric mesh is to be utilized to generate volumes for different states (i.e., modified state) of a static object. As previously referenced, a static object may be presented in different states (modified states) during execution of digital content (e.g., gameplay of a video game). Modifications to a static object (or an interior thereof) may be applied such as removing a wall, pillar, changing a layout, etc. A reduced mesh of a static object, as generated in processing operation 112, may be used as a source mesh to create a reduced mesh for a modified state of a static object. In essence, a generated volume of a static object is used to generate a floorplan of the interior of a static object in a modified state. Once a floorplan is identified from the reduced mesh for the modified state, artists can create parametric boxes (or other shapes) out of that floorplan to modify a volume of a static object or apply trained AI processing (e.g., an exemplary trained AI model) to generate a reduced mesh for a modified state of a static object. As an example, an artist may wish to remove a portion of the interior of the static object and/or add/build onto the existing interior.

In technical instances where a modified state of a static object is to be generated, flow of decision operation 118 branches YES, and processing of method 100 returns to processing operation 104. At that point, it is to be recognized that one or more of the prior discussed processing operations may be executed to generate a reduced mesh for a modified state of a static object. In some instances, this may comprise repeat execution of one or more of the processing operations 104 to 114. In further instances, trained AI processing may be applied that intelligently learns from prior created volumetric data to automatically generate a reduced mesh for a modified state of a static object in a more efficient manner. In examples where no additional states of a static object are to be determined, flow of decision operation 118 branches NO and processing of method 100 proceeds to processing operation 120.

At processing operation 120, data pertaining to a generated volume and/or reduced mesh is transmitted for integration within digital content. For example, data associated with a generated volume is propagated to a component that is configured to apply that data to digital content. An example component may be a game engine for rendering of an object mesh within a gaming environment or the like. In examples, where volumes and/or volumetric meshes) of static objects are created for different states of the static object, respective data for any created states is propagated to a component that manages rendering of a static object within digital content.

At processing operation 122, generated volumes and/or volumetric meshes are integrated within digital content (e.g., a gaming environment). Among practical applications, developers can utilize generated volumes as a data source during presentation of digital content by using such data to impact one or more of: content rendering (e.g., object rendering and/or image rendering); application of optical effects (e.g., occlusion, global illumination, shadowing, reflection, refraction, scattering, dispersion); post effects (e.g., depth of field, blur, lightening/darkening); and management of enablement/disablement of volumes during execution of digital content (e.g., enable/disable volumes during gameplay of a video game), among other examples. For example, volume data is used by developers to simulate ambient occlusion/global illumination associated with a static object without corners/edge seams. Moreover, it is to be recognized that effects (e.g., visual effects) can be determined for multiple different states of an object which can be applied at run-time during presentation of digital content (e.g., gameplay of a video game). In some examples, processing operations of method 100 is applied at run-time to dynamically manage a state of a static object using determined volume data. For instance, a state of a static object may change during a round of gameplay of a video game, where volumetric data can be dynamically generated and used to apply render digital effects.

In even further examples, integrated volume data is dynamically managed during real-time rendering of digital content. For instance, processing of the present disclosure is configured to automatically toggle control over enablement/ disablement of volume data (e.g., a specific volume), within data pertaining to the video game map of a video game environment. This may occur based on analysis of signal data collected relative to a state of the static object within the video game environment. In further examples, developers can determine whether to enable/disable volumes (volume data) during gameplay based on a contextual state of video gameplay. For instance, say a player destroys a wall of a building during gameplay which results in the building no longer being able to be returned to the prior state. It may be beneficial to (temporarily) disable a volume of an original static object so that effects (e.g., optical effects) applied to the static object (or an interior thereof) no longer consider the former state of the building. This may further improve processing efficiency during run-time as volumetric data is managed in real-time (or near real-time) and may further remove from consideration data that is unnecessary to a current state of gameplay, thereby resulting in more efficient processing at run-time. It is further to be understood that the present disclosure may automate processing to manage enablement/disablement of volume data during execution of digital content. For instance, trained AI processing is applied to execute context determinations as to a state of a static object, which may then be used to automatically toggle a state of enablement/disablement of volume data. An example scenario is that which is described above in the current paragraph. In the case where a trained AI model determines that a state of a building would no longer return to an original state, a processing determination may be automatically executed to disable volume data associated with an original state of the building (e.g., static object).

FIG. 2 illustrates an exemplary system diagram 200 of components interfacing to enable automatic generation and management of volumes of static objects within a digital environment, with which aspects of the present disclosure may be practiced. As an example, components illustrated in system diagram 200 may be executed by an exemplary computing system 301 (or multiple computing systems) as described in the description of FIG. 3. System diagram 200 describes components that may be utilized to execute processing operations described in method 100 (FIG. 1). Moreover, interactions between components of system diagram 200 may be altered without departing from the spirit of the present disclosure. Exemplary components, described in system diagram 200, may be hardware and/or software components, which are programmed to execute processing operations described herein. In some examples, components of system diagram 200 may each be one or more computing devices associated with execution of a specific service. Exemplary services may be managed by a software data platform (e.g., distributed software platform) that also provides, to a component, access to and knowledge of other components that are associated with applications/services. In one instance, processing operations described in system diagram 200 may be implemented by one or more components connected over a distributed network, where a user account may be working with a specific profile established through a distributed software platform. System diagram 200 comprises user computing devices 202; an application/ service component 204; a volume generation component 206; a component for implementation of a programmed software module/trained AI processing 208; and knowledge repositories 210.

System diagram 200 comprises user computing device(s) 202 (e.g., client computing device). An example of a user computing device 202 is a computing system (or computing systems) as described in the description of FIG. 3. A user computing device 202 may be a device that is used to execute specific processing (described in method 100; FIG.

1) to automatically generate volumes for states of static objects and further integrate the same within a digital environment (e.g., gaming environment). A user may further interact with an exemplary application/service, provided by an application/service component 204, through the user computing device(s) 202. For instance, the user may be automatically generating volumes for static objects of a gaming environment and subsequently integrate the generated volumes as data for rendering of static objects within a gaming environment. While system diagram 200 illustrates data points relative to management of video game content, it is to be recognized that similar processing components described herein may be adapted to work with any type of digital content.

An exemplary application/service component 204 is one or more components configured to provide access to data associated with an application or service and further provide application of generated volumes as digital content. Applications/services, provided through the application/service component 204, may be any type of programmed software. An exemplary application/service is a productivity application/service that is configured for rendering of a gaming environment of a video game. However, it is to be understood that processing described in the present disclosure is extensible to work with any type of application/service and any digital content. Non-limiting examples of productivity applications or services that are applicable in the present disclosure comprise but are not limited to: video game development applications/services; content rendering applications/services; graphics editing applications/services; video discussion applications/services; word processing applications/services; spreadsheet applications/services; notes/notetaking applications/services; authoring applications/services; digital presentation applications/services; presentation broadcasting applications/services; search engine applications/services; email applications/services; messaging applications/services; web browsing applications/services; collaborative communication applications/services; digital assistant applications/services; webpage building applications/service; directory applications/services; mapping services; calendaring services; electronic payment services; digital data storage or distributed data storage applications/services; web conferencing applications/services; call communication applications/services; language understanding applications/services; bot framework applications/services; networking applications/service; and social networking applications/services, among other examples.

The volume generation component 206 is one or more components configured to execute and manage processing operations related to automatic generation of volumes of static objects and generation and management of associated volumetric meshes (e.g., a reduced mesh of a static object). The volume generation component 206 is configured to execute any processing operations described herein, including those described relative to method 100 (FIG. 1). It is further to be recognized that an order of execution of processing operations by the volume generation component 206 may vary without departing from the spirit of the present disclosure. In some examples, the volume generation component 206 may be a distributed computing device (e.g., distributed server device) that executes processing asynchronously from the user computing device 202 which is usable to access a GUI of an application/service. In other examples, the volume generation component 206 is configured as a component that executes on the user computing device 202. In alternative examples, the volume generation component 206 is a system of components that execute across one or more server devices and one or more components executing on the user computing device 202, where a network connection is usable to connect the components in a system configuration.

Moreover, a component for implementation of a programmed software module/trained AI processing 208 may be applied to aid automatic generation of a reduced mesh for a static object and management of volumetric data for the static object. For instance, a programmed software module and/or trained AI processing (e.g., application of a trained AI model) may be applied to: automatically generate a reduced mesh for a static object, determine a volume of a static object (e.g., representative of an interior of the static object); and manage integration of volumetric data within digital content during rendering of the digital content, among other examples. Non-limiting examples of manners in which volumetric data can be applied and integrated within digital content have been described in the foregoing description. An exemplary component for implementation of a programmed software module/trained AI processing 208 may manage AI modeling including the creation, training, application, and updating of AI modeling. In cases where trained AI processing is applied, general application of trained AI processing including creation, training and update thereof is known to one skilled the field of art. Above what is traditionally known, a programmed software module and/or trained AI processing may be adapted to execute any of the specific processing operations described in method 100 (FIG. 1). For instance, AI model may be specifically trained and adapted for execution of processing operations comprising but not limited to: identification and retrieval of source meshes of static objects; identification of points of reference within an interior of a static object (e.g., proxy points/light probes); identification of planes associated with an interior of a static object; curation/pruning of data associated with planes to generated a reduced mesh; execution of mathematical processing operations and/or calculations necessary to achieve results described herein; generations volumes and/or volumetric meshes for different states of a static object; and management of integration of volumetric data within digital content (e.g., to apply effects and/or manage data processing during real-time rendering of digital content), among other examples.

Exemplary AI processing is applicable to aid any type of determinative or predictive processing by the collaborative media management component 106, via any of: supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM) neural networks (e.g., convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. For example, a trained AI model is implemented that applies a classifier trained based on a corpus of training data pertaining to analysis of interiors of a plurality of static objects including static objects having similar interior layouts to that which are being analyzed. This may help tune an AI model for efficient selection of proxy reference points as well as improve processing efficiency when curating/pruning data points to generate a reduced mesh, determine a volume for a static object, and integrate volumetric data with other digital content (e.g., data files to render a static object within a digital environment such as a gaming environment).

Knowledge repositories 210 of system diagram 200 may be accessed to obtain data for execution of processing operations described in method 100 (FIG. 1). For instance, knowledge repositories may comprise storage of source meshes; programmed code, corpuses of training data and/or trained AI modeling to execute processing operations described herein; data pertaining to a gaming environment and rendering of a static object within a video game; and integration of volumetric data with code of digital content apply generated volumes for practical applications, etc. Knowledge resources comprise any data affiliated with a software application platform (e.g., Microsoft®, Google®, Apple®, IBM®) as well as data that is obtained through interfacing with resources over a network connection including third-party applications/services. Furthermore, knowledge repositories 210 are resources accessible in a distributed manner via network connection that may store data usable to improve processing operations executed by the volume generation component 206. Examples of data maintained by knowledge repositories 210 comprises but is not limited to: source meshes for static objects; stored volumes of static objects and/or reduced meshes of static objects; digital content files (e.g., game engine data, video game map data, component data for execution of digital content); collected signal data (e.g., from usage of an application/service, device-specific, user-specific) including signal data collected during presentation of digital content; telemetry data including past usage of a specific user and/or group of users; corpuses of annotated data used to build and train AI processing classifiers for trained AI modeling; access to entity databases and/or other network graph databases usable for evaluation of signal data; web-based resources including any data accessible via network connection including data stored via distributed data storage; trained bots including those for natural language understanding; software modules and algorithms for contextual evaluation of content and metadata; and application/service data (e.g., data of applications/services managed by the application/service component 204) for execution of specific applications/services including video game development applications/services, among other examples.

FIG. 3 illustrates a computing system 301 suitable for implementing processing operations described herein related to generation and management of volumes and volumetric meshes, with which aspects of the present disclosure may be practiced. As referenced above, computing system 301 may be configured to implement processing operations of any component described herein including exemplary collaborative media management components as previously described. As such, computing system 301 may be configured to execute specific processing operations to solve the technical problems described herein, which comprise processing operations for intelligent and timely contextual analysis that is usable to automatically generate and manage volumetric data related to digital content. Computing system 301 may be implemented as a single apparatus, system, or device or may be implemented in a distributed manner as multiple apparatuses, systems, or devices. For example, computing system 301 may comprise one or more computing devices that execute processing for applications and/or services over a distributed network to enable execution of processing operations described herein over one or more applications or services. Computing system 301 may comprise a collection of devices executing processing for front-end applications/services, back-end applications/service or a combination thereof. Computing system 301 comprises, but is not limited to, a processing system 302, a storage system 303, software 305, communication interface system 307, and user interface system 309. Processing system 302 is operatively coupled with storage system 303, communication interface system 307, and user interface system 309. Non-limiting examples of computer system 301 comprise but are not limited to: smart phones, laptops, tablets, PDAs, desktop computers, servers, smart computing devices including television devices and wearable computing devices including VR devices and AR devices, e-reader devices, gaming consoles and devices and conferencing systems, among other non-limiting examples.

Processing system 302 loads and executes software 305 from storage system 303. Software 305 includes one or more software components (e.g., 306a and 306b) that are configured to enable functionality described herein. In some examples, computing system 301 may be connected to other computing devices (e.g., display device, audio devices, servers, mobile/remote devices, gaming devices, VR devices, AR devices, etc.) to further enable processing operations to be executed. When executed by processing system 302, software 305 directs processing system 302 to operate as described herein for at least the various processes, operational scenarios, and sequences discussed in the foregoing implementations. Computing system 301 may optionally include additional devices, features, or functionality not discussed for purposes of brevity. Computing system 301 may further be utilized to execute method 100 (FIG. 1) and system diagram 200 (FIG. 2).

Referring still to FIG. 3, processing system 302 may comprise processor, a micro-processor and other circuitry that retrieves and executes software 305 from storage system 303. Processing system 302 may be implemented within a single processing device but may also be distributed across multiple processing devices or sub-systems that cooperate in executing program instructions. Examples of processing system 302 include general purpose central processing units, microprocessors, graphical processing units, application specific processors, sound cards, speakers and logic devices, gaming devices, VR devices, AR devices as well as any other type of processing devices, combinations, or variations thereof.

Storage system 303 may comprise any computer readable storage media readable by processing system 302 and capable of storing software 305. Storage system 303 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 303 may also include computer readable communication media over which at least some of software 305 may be communicated internally or externally. Storage system 303 may be implemented as a single storage device but may also be implemented across multiple storage devices or sub-systems co-located or distributed relative to each other. Storage system 303 may comprise additional elements, such as a controller, capable of communicating with processing system 302 or possibly other systems.

Software 305 may be implemented in program instructions and among other functions may, when executed by processing system 302, direct processing system 302 to operate as described with respect to the various operational scenarios, sequences, and processes illustrated herein. For example, software 305 may include program instructions for executing one or more volume generation component(s) 306a as described herein. Software 305 may further comprise application/service component(s) 306b that provide applications/services as described in the foregoing description such as applications/services that enable access presentation of content based on generated volumes and/or volumetric meshes.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 305 may include additional processes, programs, or components, such as operating system software, virtual machine software, or other application software. Software 305 may also comprise firmware or some other form of machine-readable processing instructions executable by processing system 302.

In general, software 305 may, when loaded into processing system 302 and executed, transform a suitable apparatus, system, or device (of which computing system 301 is representative) overall from a general-purpose computing system into a special-purpose computing system customized to execute specific processing components described herein as well as process data and respond to queries. Indeed, encoding software 305 on storage system 303 may transform the physical structure of storage system 303. The specific transformation of the physical structure may depend on various factors in different implementations of this description. Examples of such factors may include, but are not limited to, the technology used to implement the storage media of storage system 303 and whether the computer-storage media are characterized as primary or secondary storage, as well as other factors.

For example, if the computer readable storage media are implemented as semiconductor-based memory, software 305 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 307 may include communication connections and devices that allow for communication with other computing systems (not shown) over communication networks (not shown). Communication interface system 307 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 309 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 309. In some cases, the input and output devices may be combined in a single device, such as a display capable of displaying images and receiving touch gestures. The aforementioned user input and output devices are well known in the art and need not be discussed at length here.

User interface system 309 may also include associated user interface software executable by processing system 302 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: digital content development applications/services that enable management of meshes and volumetric data; an improved GUI providing that enables control over the application of visual effects within digital content relative to integrated volumetric data; real-time control over management of volumetric data during rendering of digital content, among other examples. As one example, a GUI of a digital content development application/service is adapted to help guide developers/artists through automated processing to generate a reduced mesh and volumetric data. In some instances, GUI prompts may be presented to developers to aid with the selection of proxy reference points for volumetric mesh generation. User interface system 309 comprises a graphical user interface that presents graphical user interface elements representative of any point in the processing described in the foregoing description including processing operations described in method 100 (FIG. 1) and system diagram 200 (FIG. 2). A graphical user interface of user interface system 309 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 301 that enable output of other types of signals (e.g., audio output) in conjunction with operation of exemplary applications/services (e.g., digital content development application/service and/or video game application/service) described herein.

Communication between computing system 301 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

In one non-limiting example, a computer-implemented method is executed on a computing device. The computer-implemented method is adapted for automatically generating a volume of a static object of digital content. As a first processing step, a source mesh of the static object is retrieved. The source mesh is analyzed to determine reference points within an interior of the static object. In some examples, known data reference points of a specific object type are identified as exemplary reference points. For instance, light probes (light probe objects) associated with an interior of a static object are identified as reference points of interest. In other examples, processing is executed that automatically generating proxy reference points for placement within an interior of the static object. In some instances, this happens in lieu of identifying known reference points and in other instances this happens in addition to identification of known reference points. In technical instances where proxy reference points are generated, the proxy reference points are automatically placed at different positions within the interior of the static object.

Continuing the above example, a list of planes associated with the interior of the static object is generated relative to the determined reference points. The list of planes is then curated to isolate a subset of relevant planes within the interior of the static object. As an example, the curating of the list of planes comprises identifying planes of the interior of the static object that are inward facing relative to the reference points within the interior of the static object. That is, the subset of relevant planes within the interior of the static object comprises only planes of the interior of the static object that are identified as being inward facing relative to the reference points within the interior of the static object. In further examples, the curating of the list of planes comprises identifying planes of the interior of the static object that are outward facing relative to the reference points within the interior of the static object. Planes that are identified as being outward facing are discarded from the subset of relevant planes within the interior of the static object. The subset of relevant planes is then pruned (or curated) to identify a subset of relevant data points associated with the subset of relevant planes. Pruning of the subset of relevant planes to identify relevant data points for each plane of the subset of relevant planes comprises: determining a view-point direction, from a user perspective, of each of the planes of the subset of relevant planes; selecting one or more relevant data points for each of the planes of the subset of relevant planes based on result of analysis of the view-point direction of each of the planes; and identifying intersecting data points for the subset of relevant planes. Processing is applied to automatically generate a reduced mesh of the static object based on analysis of the subset of relevant data points, which are derived as a result of the pruning of the subset of relevant planes. For instance, the automatically generating of the reduced mesh of the static object comprises plotting the one or more relevant data points for each of the planes and the intersecting data points. Once a reduced mesh is generated, the reduced mesh the subset of relevant data points associated with the reduced mesh are analyzed to automatically determine a volume of the static object.

Furthermore, data of a determined volume is further propagated to aid management of run-time processing of data related to the digital content as well as the application of presentation effects relative to rendering of a static object. For example, data pertaining to the volume of the static object is transmitted to a component for integration of the volume within data pertaining to a video game map of a video game environment or other type of digital content. In one instance, analysis of the volume of the static object is used to aid generation of ambient occlusion values for an interior of a static object. In further examples, a component for managing digital content toggles control over enablement/disablement of the volume data during run-time processing. For instance, signal data collected relative to a state of a static object within digital content (e.g., video game environment) is analyzed to generate automated determinations as to how to toggle control over enablement/disablement of the volume data within data pertaining to a video game map of a video game environment. This enables efficient processing of data pertaining to digital content during run-time.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method, executed on a computing device, for automatically generating a volume of a static object of digital content, the computer-implemented method comprising:
    retrieving a source mesh of the static object of the digital content;
    analyzing the source mesh to determine reference points within an interior of the static object;
    generating a list of planes associated with the interior of the static object relative to the reference points;
    curating the list of planes to isolate a subset of relevant planes within the interior of the static object;
    pruning the subset of relevant planes to identify a subset of relevant data points associated with the subset of relevant planes;
    automatically generating a reduced mesh of the static object based on the subset of relevant data points identified as a result of the pruning of the subset of relevant planes; and
    automatically determining a volume of the static object based on analysis of the subset of relevant data points associated with the reduced mesh.

2. The computer-implemented method of claim 1, wherein the reference points within the interior of the static object are light probes associated with the static object.

3. The computer-implemented method of claim 1, wherein the curating of the list of planes comprises identifying planes of the interior of the static object that are inward facing relative to the reference points within the interior of the static object, and wherein the subset of relevant planes within the interior of the static object comprises only planes of the interior of the static object that are identified as being inward facing relative to the reference points within the interior of the static object.

4. The computer-implemented method of claim 3, wherein the curating of the list of planes comprises identifying planes of the interior of the static object that are outward facing relative to the reference points within the interior of the static object, and discarding, from the subset of relevant planes within the interior of the static object, the planes of the interior of the static object that are outward facing relative to the reference points.

5. The computer-implemented method of claim 3, wherein the pruning of the subset of relevant planes to identify relevant data points for each plane of the subset of relevant planes comprises: determining a view-point direction, from a user perspective, of each of the planes of the subset of relevant planes; selecting one or more relevant data points for each of the planes of the subset of relevant planes based on result of analysis of the view-point direction of each of the planes; and identifying intersecting data points for the subset of relevant planes, and wherein the automatically generating of the reduced mesh of the static object comprise plotting the one or more relevant data points for each of the planes and the intersecting data points.

6. The computer-implemented method of claim 1, further comprising: transmitting the volume of the static object to a component for integration of the volume within data pertaining to a video game map of a video game environment.

7. The computer-implemented method of claim 6, further comprising: generating ambient occlusion values for the interior of the static object based on analysis of the volume of the static object.

8. The computer-implemented method of claim 6, further comprising: automatically toggling control over enablement/disablement of the volume, within data pertaining to the video game map of a video game environment, based on signal data collected relative to a state of the static object within the video game environment.

9. A system comprising:
    at least one processor; and
    a memory, operatively connected with the at least one processor, storing computer-executable instructions that, when executed by the at least one processor, causes the at least one processor to execute a method that comprises:
    retrieving a source mesh of a static object from digital content,
    analyzing the source mesh to determine reference points within an interior of the static object,
    generating a list of planes associated with the interior of the static object relative to the reference points,
    curating the list of planes to isolate a subset of relevant planes within the interior of the static object,
    pruning the subset of relevant planes to identify a subset of relevant data points associated with the subset of relevant planes,
    automatically generating a reduced mesh of the static object based on the subset of relevant data points identified as a result of the pruning of the subset of relevant planes; and
    automatically determining a volume of the static object based on analysis of the subset of relevant data points associated with the reduced mesh.

10. The system of claim 9, wherein the reference points within the interior of the static object are light probes associated with the static object.

11. The system of claim 9, wherein the curating of the list of planes comprises identifying planes of the interior of the static object that are inward facing relative to the reference points within the interior of the static object, and wherein the subset of relevant planes within the interior of the static object comprises only planes of the interior of the static object that are identified as being inward facing relative to the reference points within the interior of the static object.

12. The system of claim 11, wherein the curating of the list of planes comprises identifying planes of the interior of the static object that are outward facing relative to the reference points within the interior of the static object, and discarding, from the subset of relevant planes within the interior of the static object, the planes of the interior of the static object that are outward facing relative to the reference points.

13. The system of claim 11, wherein the pruning of the subset of relevant planes to identify relevant data points for each plane of the subset of relevant planes comprises: determining a view-point direction, from a user perspective, of each of the planes of the subset of relevant planes; selecting one or more relevant data points for each of the planes of the subset of relevant planes based on result of analysis of the view-point direction of each of the planes; and identifying intersecting data points for the subset of relevant planes, and wherein the automatically generating of the reduced mesh of the static object comprise plotting the one or more relevant data points for each of the planes and the intersecting data points.

14. The system of claim 9, wherein the method, executed by the at least one processor, further comprises: transmitting the volume of the static object to a component for integration of the volume within data pertaining to a video game map of a video game environment.

15. The system of claim 14, wherein the method, executed by the at least one processor, further comprises: generating ambient occlusion values for the interior of the static object based on analysis of the volume of the static object.

16. The system of claim 14, wherein the method, executed by the at least one processor, further comprises: automatically toggling control over enablement/disablement of the volume, within data pertaining to the video game map of a video game environment, based on signal data collected relative to a state of the static object within the video game environment.

17. A computer-implemented method, executed on a computing device, for automatically generating a volume of a static object of a video game map, the computer-implemented method comprising:

retrieving a source mesh of the static object of the video game map;
automatically generating proxy reference points for placement within an interior of the static object, wherein the proxy reference points are automatically placed at different positions within the interior of the static object;
generating a list of planes associated with the interior of the static object relative to the reference points;
curating the list of planes to isolate a subset of relevant planes within the interior of the static object;
pruning the subset of relevant planes to identify a subset of relevant data points associated with the subset of relevant planes;
automatically generating a reduced mesh of the static object based on the subset of relevant data points identified as a result of the pruning of the subset of relevant planes; and
automatically determining a volume of the static object based on analysis of the subset of relevant data points associated with the reduced mesh.

18. The computer-implemented method of claim 17, wherein the curating of the list of planes comprises identifying planes of the interior of the static object that are inward facing relative to the reference points within the interior of the static object, and wherein the subset of relevant planes within the interior of the static object comprises only planes of the interior of the static object that are identified as being inward facing relative to the reference points within the interior of the static object.

19. The computer-implemented method of claim 17, wherein the pruning of the subset of relevant planes to identify relevant data points for each plane of the subset of relevant planes comprises: determining a view-point direction, from a user perspective, of each of the planes of the subset of relevant planes; selecting one or more relevant data points for each of the planes of the subset of relevant planes based on result of analysis of the view-point direction of each of the planes; and identifying intersecting data points for the subset of relevant planes, and wherein the automatically generating of the reduced mesh of the static object comprise plotting the one or more relevant data points for each of the planes and the intersecting data points.

20. The computer-implemented method of claim 17, further comprising: transmitting the volume of the static object to a component for integration of the volume within data pertaining to the video game map.

* * * * *